P. M. CIERNIA.
SEAL BOLT.
APPLICATION FILED JULY 17, 1913.
1,079,839.
Patented Nov. 25, 1913.
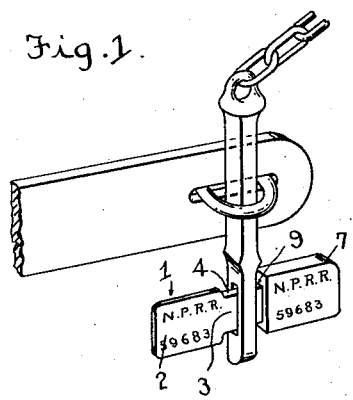
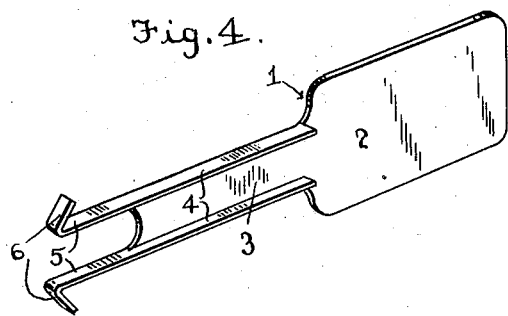
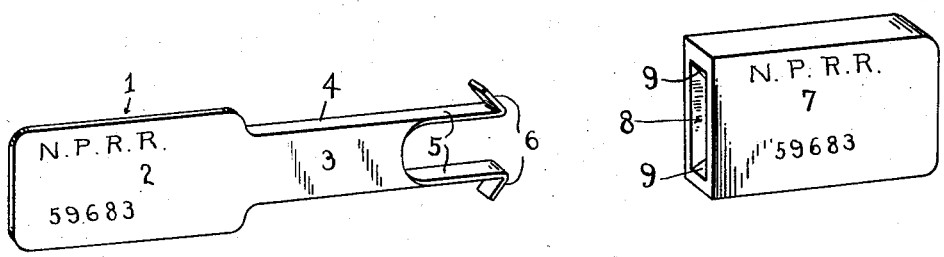
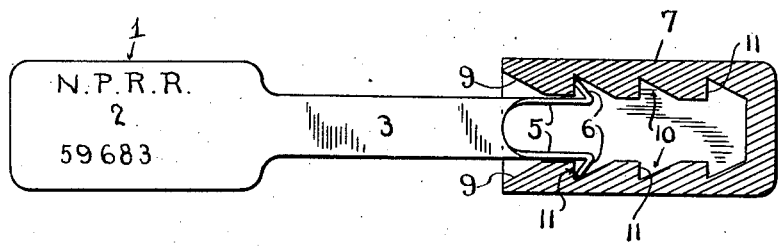
Inventor
Peter M. Ciernia
Witnesses
L. B. James
C. E. Hunt
By H. B. Willson &co.
Attorneys

UNITED STATES PATENT OFFICE.

PETER M. CIERNIA, OF ST. PAUL, MINNESOTA.

SEAL-BOLT.

1,079,839.  Specification of Letters Patent.  Patented Nov. 25, 1913.

Application filed July 17, 1913. Serial No. 779,586.

*To all whom it may concern:*

Be it known that I, PETER M. CIERNIA, a citizen of the United States, residing at St. Paul, in the county of Ramsey and State of Minnesota, have invented certain new and useful Improvements in Seal-Bolts; and I do declare the following to be a full, clear, and exact description of the invention, such as will enable others skilled in the art to which it appertains to make and use the same.

This invention relates to improvements in seals, for the fastenings of freight car doors and other objects.

One object of the invention is to provide a seal of this character the parts of which when brought together in operative position cannot be separated without breaking or destroying the seal to such an extent that the parts can not be replaced or again connected.

Another object is to provide a seal of this character which will be simple, strong and inexpensive in construction, efficient and reliable in operation and well adapted for the purpose for which it is designed.

With these and other objects in view, the invention consists of certain novel features of construction, and the combination and arrangement of parts as will be more fully described and claimed.

In the accompanying drawings: Figure 1 is a perspective view of my improved seal showing the same applied to a car door fastening; Fig. 2 is a similar view showing the parts separated or in inoperative position; Fig. 3 is a longitudinal sectional view of the socket or keeper member of the seal showing the fastening member engaged therewith; Fig. 4 is an inverted perspective view of the bolt or fastening engaging member of the seal.

My improved seal comprises a bolt or fastening engaging member 1 which is preferably formed from a metal plate cut or stamped to form a tag or plate 2 of any suitable size and shape and which is designed to receive the initials, numbers or any other inscription it may be desired to place thereon. One end of the plate 2 is extended to form the fastening engaging bolt or tongue 3 which is of suitable width and length and which has its edges bent inwardly at right angles to form flanges 4 which are extended a considerable distance beyond the end of the tongue 3 to form spring catch fingers 5. The outer ends of the fingers are bent back at suitable angles to form catch lugs 6 the purpose of which will hereinafter appear.

The other member or keeper of the seal comprises a body 7 which may be formed of metal, glass, porcelain or any other suitable frangible material and has therein a longitudinally disposed socket 8 which opens through one end of the body and has the opposite ends of the opening flared as at 9 to permit the engaging end of the bolt member 1 to be readily inserted therein. The opposite edges of the socket have formed therein series of ratchet shaped notches 10 which provide stop shoulders or teeth 11. When the spring fingers 5 on the end of the tongue or bolt member 3 are forced into the socket 8 the lugs 6 on the ends of the fingers will spring into engagement with the notches 10 and shoulders 11 thus positively preventing the retraction or disengagement of the bolt member from the socket member or keeper, without first breaking the latter. By forming a series of notches 10 and shoulders 11 an adjustable engagement is provided for the bolt member whereby all play or lateral movement may be taken up when the bolt member is engaged with pins or other fastenings of different sizes. The socket member 7 may also have placed thereon initials, numbers or other inscriptions such inscriptions preferably corresponding to the inscription on the plate or tag 2 of the bolt member.

By providing a seal constructed as herein shown and described it will be seen that when the parts are engaged with a fastening and are brought together that the separation of the parts can only be accomplished by first breaking the socket member or so mutilating the same that any tampering with the seal or fastening can be readily detected.

It will be noted that the flanges 4 on the tongue or bolt of the member 1 while being provided especially for forming the spring fingers 5 also serve to reinforce and impart rigidity to the tongue or bolt 3. It will also be understood that while the seal is designed particularly for use in connection with fastenings of freight car doors it is obvious that the seal may be employed in connection with the fastenings of any objects such for instance as box or chest lids, packing cases and the like.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:

In a seal of the character described a bolt member comprising a plate adapted to receive an inscription, a reduced bolt portion or fastening engaging tongue on one end of said plate, reinforcing flanges on the edges of said tongue, said flanges being extended beyond the tongue to form spring keeper engaging fingers, catch lugs formed on the ends of said fingers, a frangible keeper member having therein a socket provided along its edges with ratchet shaped notches forming stop shoulders and adapted to receive said catch lugs when said tongue and spring fingers of the bolt member are engaged therewith.

In testimony whereof I have hereunto set my hand in presence of two subscribing witnesses.

PETER M. CIERNIA.

Witnesses:
GEORGE A. McGUIRE,
ADOLPH J. FETSCH.

Copies of this patent may be obtained for five cents each, by addressing the "Commissioner of Patents, Washington, D. C."